United States Patent
Sasahara

(10) Patent No.: US 6,374,342 B1
(45) Date of Patent: Apr. 16, 2002

(54) TRANSLATION LOOKASIDE BUFFER MATCH DETECTION USING CARRY OF LOWER SIDE BIT STRING OF ADDRESS ADDITION

(75) Inventor: Masashi Sasahara, Kawasaki (JP)

(73) Assignee: Kabushiki Kaisha Toshiba (JP)

( * ) Notice: Subject to any disclaimer, the term of this patent is extended or adjusted under 35 U.S.C. 154(b) by 0 days.

(21) Appl. No.: 09/494,834

(22) Filed: Jan. 31, 2000

(51) Int. Cl.[7] ............................................... G06F 12/10
(52) U.S. Cl. ...................... 711/207; 711/212; 711/219
(58) Field of Search ............................ 711/3, 206, 207, 711/212, 219, 220, 221

(56) References Cited

U.S. PATENT DOCUMENTS

| | | | |
|---|---|---|---|
| 5,335,333 A | * 8/1994 | Hinton et al. | 711/207 |
| 5,502,829 A | * 3/1996 | Sachs | 711/207 |
| 5,606,683 A | 2/1997 | Riordan | 711/207 |
| 5,953,748 A | * 9/1999 | Riordan | 711/207 |
| 5,970,512 A | * 10/1999 | Martens et al. | 711/205 |
| 5,974,520 A | * 10/1999 | Huang | 711/206 |

FOREIGN PATENT DOCUMENTS

JP         2001034537    *  2/2001   ........... G06F/12/10

* cited by examiner

Primary Examiner—Do Hyun Yoo
Assistant Examiner—Gary J. Portka
(74) Attorney, Agent, or Firm—Gray Cary Ware & Freidenrich LLP

(57) ABSTRACT

There is disclosed DTLB in a microprocessor of the present invention, comprising an adder for adding a base address and a sign-extended offset address; a comparator for judging whether or not upper side 20 bits [31:12] of the base address match the base address stored in a upper side address storage section in CAM 35, and upper side 4 bits [15:12] of the offset address match the offset address stored in the CAM; a comparator for judging whether or not a carry signal outputted from the adder and a carry signal stored in a carry storage section in the CAM are matched; and a match detector for outputting a match signal when comparison results of the comparators are matched. With lower side 12 bits of the virtual address, the judgment of match/mismatch is performed only with the carry signal. Therefore, the match/mismatch of the virtual address can be judged before the addition processing in the adder is completed.

11 Claims, 9 Drawing Sheets

```
  0x80000000              0x80000fff
+    0x1234              +    0x0125
  ──────────              ──────────
  0x80001234              0x80001234

FIG. 10A                FIG. 10B
```

| OFFSET ADDRESS UPPER SIDE 4 BITS | | CARRY SIGNAL | | ADDITION VALUE |
|---|---|---|---|---|
| (1) | A | + 0 | = | A |
| (2) | A-1 | + 1 | = | A |
| (3) | A+1 | + 0 | = | A+1 |
| (4) | A | + 1 | = | A+1 |

FIG. 11

TRANSLATION LOOKASIDE BUFFER MATCH DETECTION USING CARRY OF LOWER SIDE BIT STRING OF ADDRESS ADDITION

BACKGROUND OF THE INVENTION

1. Field of the Invention

The present invention relates to a TLB circuit for converting a virtual address to a physical address, particularly to a technique of judging at a high speed whether or not a virtual address which has received an access request matches a virtual address stored inside a processor.

2. Related Background Art

To eliminate a speed difference between a processor and a main memory, it is general to dispose a cache memory between them. The cache memory is incorporated in the processor in some cases, or disposed outside the processor in the other cases.

When data requested by the processor exists in the cache memory (cache hit), the data is transferred from the cache memory to the processor, and therefore, the processor does not have to access the main memory, so that the processor can perform the processing at a high speed. On the other hand, when the data requested by the processor does not exist in the cache memory, the processor has to directly access the main memory, so that it takes much time to perform the processing.

A recent processor employs a virtual address system in which a part of a virtual address space is allocated to the main memory. By employing the virtual address system, it is possible to access memory, regardless of the main memory.

The virtual address can be obtained, for example, by adding a base address and an offset address. To perform this addition, an adder is disposed in the processor. Moreover, in the processor, a TLB circuit for converting the virtual address to a physical address is disposed. The TLB circuit outputs a signal indicating whether or not the virtual address which has been received from the outside matches the virtual address stored inside.

In the recent processor, the virtual address has a large number of bits, so that it takes much time to perform the addition processing in the adder. Therefore, if the address conversion processing in the TLB circuit is started after the addition processing in the adder has been completed, much time is taken until the physical address is outputted. Therefore, when a part of the physical address is used for checking the cache hit, the process in case of the cache hit cannot be performed at a high speed.

To solve the problem, in U.S. Pat. No. 5,606,683, based on the result of addition of some bit strings of the base address and the offset address and digit overflow information, the match/mismatch of the virtual address is detected. However, also in the above-described document, the adder is used to calculate the address. Since the address conversion processing cannot be performed until the output of the adder is obtained, the cache hit check cannot be performed at a high speed.

SUMMARY OF THE INVENTION

An object of the present invention is to provide a microprocessor in which conversion from a virtual address to be accessed by the processor into a physical address can be performed at a high speed and it is possible to determine at a high speed whether or not cache hit is.

To attain the above-described object, there is provided a translation lookaside buffer (TLB) circuit for converting a virtual address to a physical address comprising:

a carry storage section for storing digit overflow information when a lower side bit string of a base address and a lower side bit string of an offset address of virtual address information as a comparison criterion are added to each other;

a upper side address storage section for storing a upper side bit string of the base address and a upper side bit string of the offset address of the virtual address information as the comparison criterion;

a carry comparator for comparing a digit overflow information when a lower side bit string of the base address and a lower side bit string of the offset address of the virtual address information which has received an access request are added to each other, with the digit overflow information stored in said carry storage section;

a upper side address comparator for detecting whether or not the upper side bit string of the base address of the virtual address information which has received the access request matches the upper side bit string of the base address stored in said upper side address storage section, and for detecting whether or not the upper side bit string of the offset address of the virtual address information which has received the access request matches the upper side bit string of the off set address stored in said upper side address storage section; and a match detector for outputting a match signal of the virtual address only when comparison results by said carry comparator are matched and comparison results by the upper side address comparator are matched.

According to the present invention, for the lower side bit strings of the base and offset addresses, instead of comparing the addition results of both addresses, carry signals are compared, so that it can be detected at a high speed whether or not the virtual addresses are matched.

Moreover, there is provided a translation lookaside buffer (TLB) circuit for converting a virtual address to a physical address comprising:

a first storage section for storing a upper side bit string of a base address of virtual address information as a comparative criterion;

a second storage section for storing a bit string obtained by adding 1 to a upper side bit string of an offset address of the virtual address information in the case where there is a digit overflow when a lower side bit string of the base address and a lower side bit string of the offset address of the virtual address information as the comparison criterion are added to each other, and for storing the upper side bit string of the offset address of the virtual address information in the case where there is no digit overflow;

a third storage section for storing the upper side bit string of the offset address of the virtual address information in the case where there is the digit overflow when the lower side bit string of the base address and the lower side bit string of the offset address of the virtual address information as the comparison criterion are added to each other, and for storing the bit string obtained by subtracting 1 from the upper side bit string of the offset address of the virtual address information in the case where there is no digit overflow;

a first comparator for comparing the upper side bit string of the base address of the virtual address information which has received the access request, with the bit string stored in said first storage section;

a second comparator for comparing the lower side bit string of the base address of the virtual address information which has received the access request, with the bit string stored in said second storage section;

a third comparator for comparing whether or not the lower side bit string of the base address of the virtual address information which has received the access request matches the bit string stored in said third storage section; and a match detector for outputting a signal indicating whether or not the virtual address which has received the access request matches the virtual address as the comparison criterion on the basis of comparison results of said first to third comparators.

Moreover, according to the present invention, after the offset address is regulated in accordance with a value of carry signal, the addresses are compared. Therefore, regardless of the presence/absence of a carry, it is possible to accurately compare the virtual addresses.

BRIEF DESCRIPTION OF THE DRAWING

FIGS. 10a and 10b are diagrams showing examples of calculation of the base address and the offset address.

FIG. 11 is a diagram showing an example in which cache hit detection cannot accurately be performed in the first and second configuration examples.

DESCRIPTION OF THE PREFERRED EMBODIMENTS

An embodiment of microprocessor according to the present invention will be described hereinafter in detail with reference to the drawings. In the following, as an example, MIPS type of microprocessor will be described.

Figure 1:
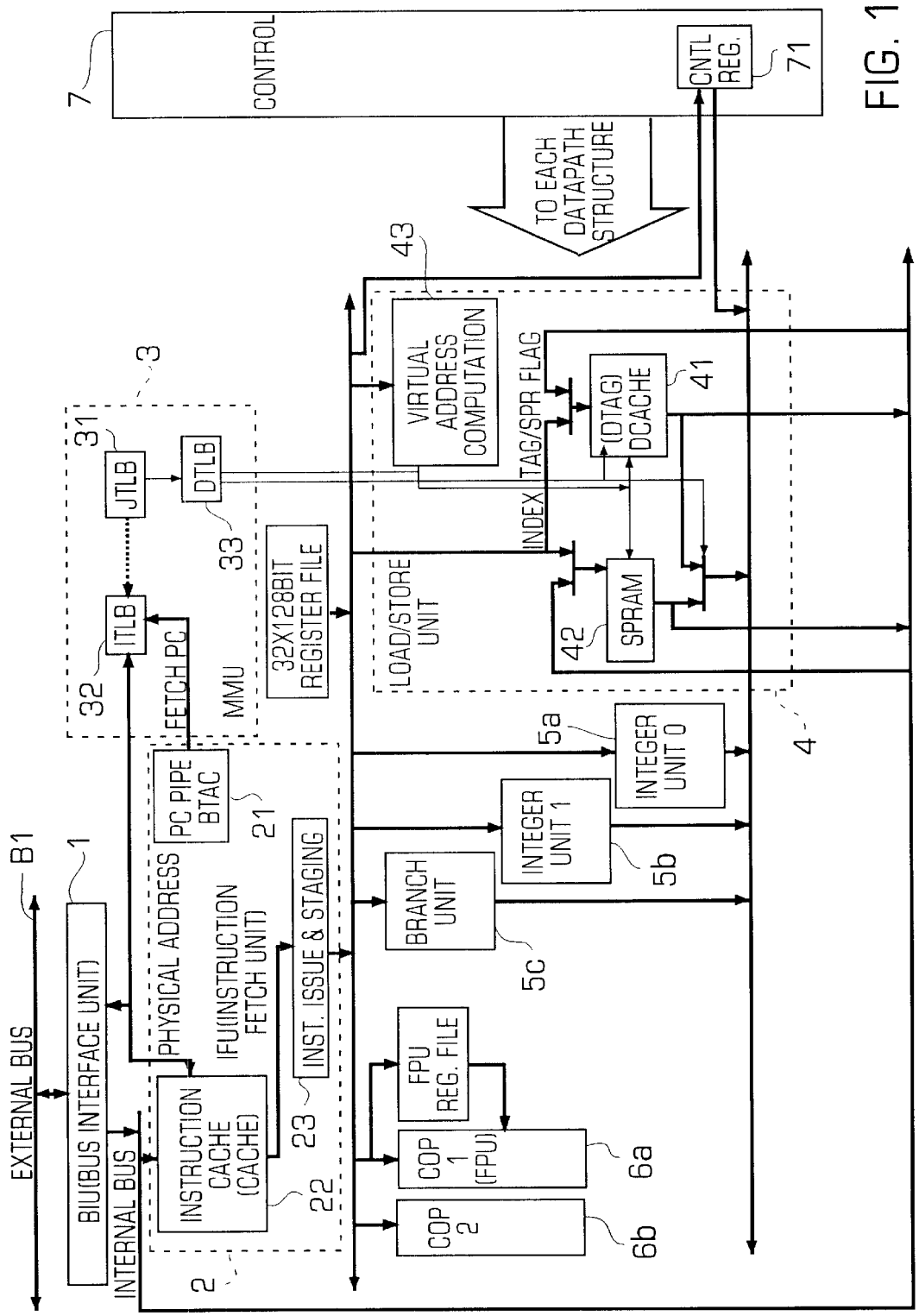
FIG. 1 is a block diagram showing an inside configuration of a microprocessor according to the present invention.

FIG. 1 is a block diagram showing an inside configuration of the microprocessor according to the present invention. The microprocessor of FIG. 1 comprises a Bus Interface Unit 1 connected to an external bus B1, IFU (Instruction Fetch Unit) 2 which fetches instructions to be executed by a processor, an MMU (Memory Management Unit) 3 which converts virtual addresses to physical addresses, an LSU (Load Store Unit) 4 which executes instructions relating to load/store, a plurality of executing units 5a, 5b and 5c which execute the instructions other than load/store, FPU (Floating Point Units) 6a, 6b which execute floating point calculation, and a Control Logic 7 which controls each block in the processor.

The IFU 2 includes a PC-pipe 21 which generates a PC (Program Counter) by referring to the BTAC which stores branch addresses of instructions such as a branch instruction, an ICACHE (Instruction Cache memory) 22 which temporarily stores the instructions, and an Instruction issue & Staging block 23 which recognizes the type of the instruction and selects the executing unit to execute the recognized instruction.

The MMU 3 has three TLBs (Translation Lookaside Buffers) which convert the virtual addresses to physical addresses. Address converting information needed by the processor, such as a physical page number and memory protection information, are written to the TLBs. Based on this information, the MMU 3 executes the conversion to the physical address.

Three types of the TLBs in the MMU 3 are a JTLB (Joint Translation Lookaside Buffer) 31, an ITLB (Instruction Translation Lookaside Buffer) 32, and a DTLB (Data Translation Lookaside Buffer) 33.

The ITLB 32 and the DTLB 33 are called a micro TLB as a generic name. The ITLB 32 is a specific TLB connected directly to a datapath of the virtual address of the instruction. The DTLB 33 is a specific TLB connected directly to the datapath of the virtual address of data. These TLBs have a small number of entries, and execute address conversion at a high speed. A portion of a conversion table generated by the JTLB 31 is copied to the ITLB 32 or the DTLB 33 as necessary.

The JTLB 31 is controlled by software, while the coherency between micro TLBs and the JTLB is maintained by hardware. The microprocessor issues an exception when there is no conversion table in the JTLB 31. An exception handler searches the corresponding page from a page table on an OS memory and writes the information into the JTLB 31.

The LSU 4 comprises a DCACHE (Data Cache Memory) 41 which temporarily stores data read out from and written into the external memory, an SPRAM (Scratch Pad RAM) 42 used for specific purposes other than caching, and an address generator (Virtual Address Computation) 43 which generates the virtual address necessary to access the DCACHE 41 and the SPRAM 42.

The Control Logic 7 controls each block in the processor. Inside the Control Logic 7, a Control Register 71 is provided.

Next, the operation of the microprocessor shown in FIG. 1 will be described. First, the IFU 2 fetches the instructions based on the PC generated by the PC-pipe 21. Additionally, the PC is a virtual address.

The ITLB 32 converts the PC from the virtual address to the physical address. The converted physical address is employed for searching an ITAG in the ICACHE 22. Specifically, the physical address is used to detect whether or not the instruction designated by the PC exists in the ICACHE 22. When the instruction designated by the PC does not exist in the ICACHE 22, that is, when a cache-miss occurs, the access to the external memory (not shown) is performed using the physical address.

When the cache-miss occurs, information indicative of the occurrence of the cache-miss and physical address information are transferred to Control Logic in the BIU 1. The BIU 1 accesses the external memory based on these information. When the access to the external memory finishes, a signal informing of acquisition of a cache line is supplied to the IFU 2. The IFU 2 writes the data obtained by the access to the memory into the ICACHE 22. Additionally, among the instructions included in the refilled cache line, the instruction designated by the PC and in certain cases, several instructions following the instruction designated by the PC are supplied to the Instruction issue & Staging block 23.

On the other hand, if the instruction designated by the PC exists in the ICACHE 22, the corresponding instruction in the ICACHE 22 and in certain cases, several instructions following the instruction designated by the PC are supplied to the Instruction issue & Staging block 23.

The Instruction issue & Staging block 23 recognizes the types of the instructions and determines the executing unit which executes the instructions, for example, the LSU 4, and other executing units. In this case, the Instruction issue & Staging block 23 dynamically determines any one of the executing units in accordance with the vacant state of each executing unit.

For example, in the case where the recognized instruction is a load/store instruction, since only the LSU 4 is able to execute the instruction, the Instruction issue & Staging block 23 sends the instruction to the LSU 4 at the time when the LSU 4 is ready to execute the instruction.

Figure 2:
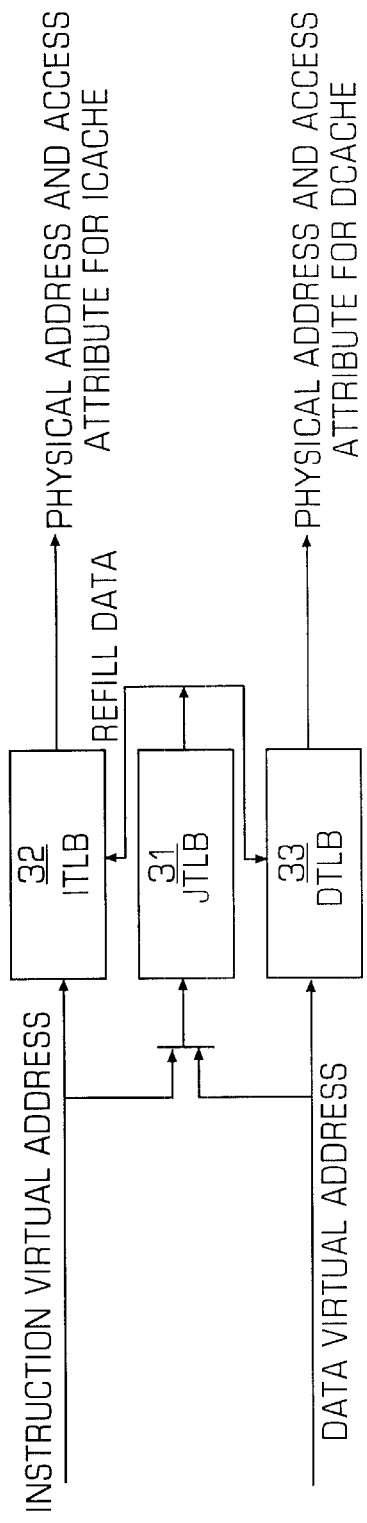
FIG. 2 is a diagram showing an inside configuration of MMU 3.

FIG. 2 is a diagram showing the inner configuration of the MMU 3. As described above, three TLBs are provided inside the MMU 3. Among these TABS, the JTLB 31 is a true TLB. The JTLB 31 has, for example, 48 entries, and by mapping the virtual address by each page, generates a conversion table for conversion to the physical address.

The conversion table 100 generated by the JTLB 31 is copied to the ITLB 32 and the DTLB 33, as required. Thus, the reason for dividing the TLBs into three pieces is that it takes much time to perform an address conversion processing, because the JTLB 31 has many entries. Therefore, only a portion which is actually necessary for the conversion in the conversion table 100 is copied to the ITLB 32 or the DTLB 33 in order to perform the conversion processing at a high speed.

Figure 3:
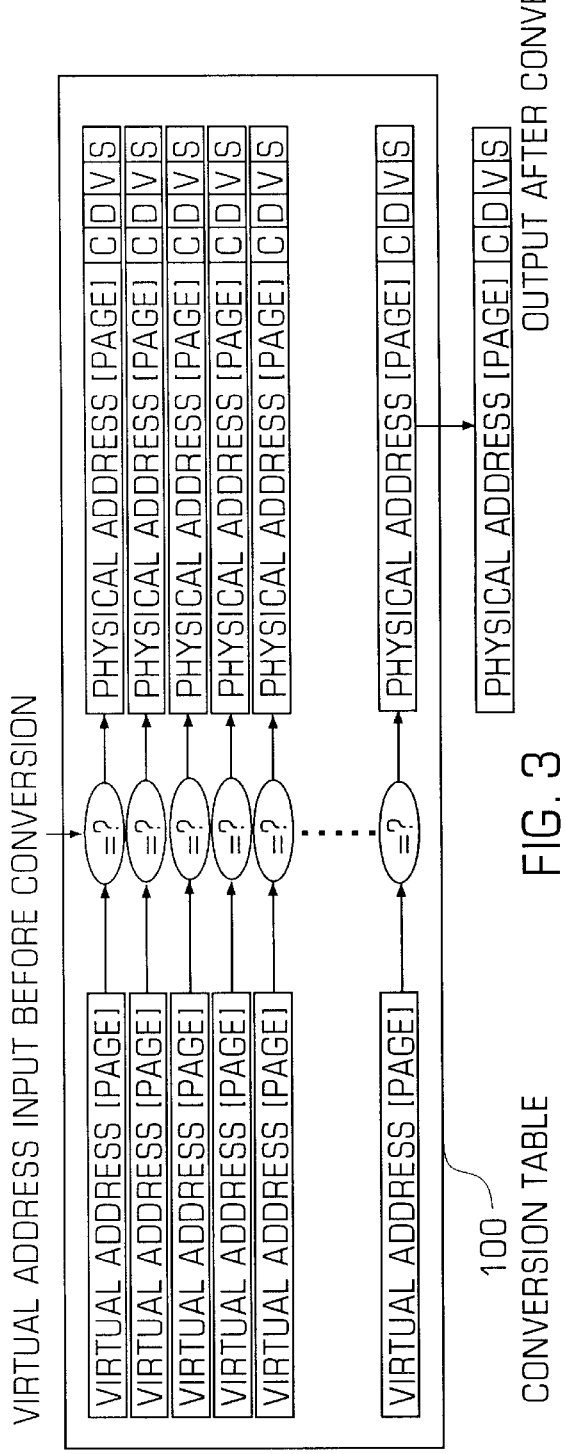
FIG. 3 is a diagram showing an example of conversion table 100 in JTLB 31.

FIG. 3 is a diagram showing an example of the conversion table 100 in the JTLB 31. As shown in FIG. 3, in the conversion table 100, the page number of the virtual address, the corresponding physical address, and flag information are recorded.

The flag information includes a C flag showing whether or not the cache is allowable, a D flag showing whether or not the writing to the memory is allowable, a V flag showing whether or not conversion entry is valid, and an S flag showing whether or not the access to the SPRAM is performed.

Figure 4:
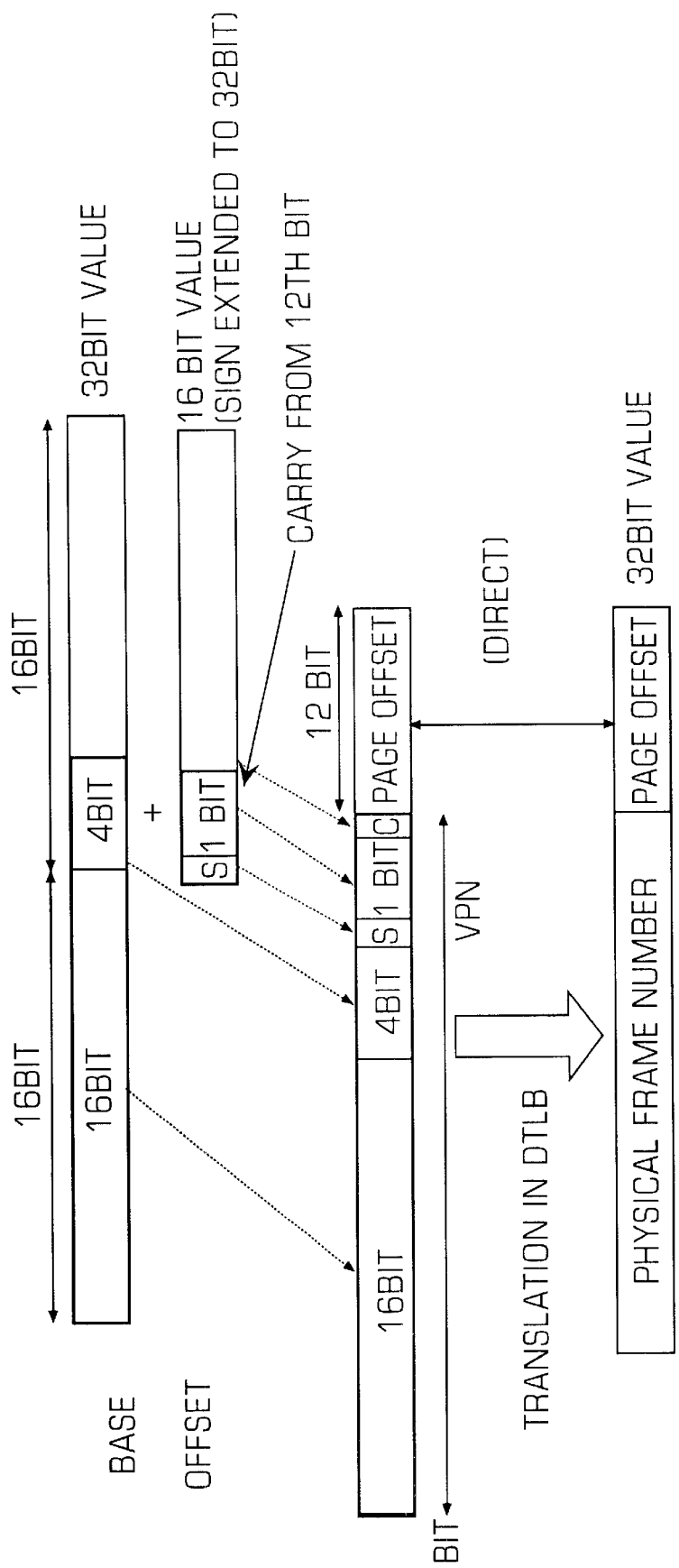
FIG. 4 is a diagram showing data structures of base address, offset address, virtual address, and physical address.

FIG. 4 is a diagram showing data structures of base address, offset address, virtual address, and physical address. Upper side 20 bits of the virtual address indicate VPN (Virtual Page Number), and lower side 12 bits of the virtual address Indicate page offset.

The VPN is constituted of upper side 20 bits [31:12] of the base address, upper side 3 bits [14:12] of the offset address, a sign bit S indicating a positive or negative sign added to the offset address, and a carry bit C obtained by adding the lower side 12 bits of each of the base address and the offset address.

The page offset of the virtual address is a result of adding the lower side 12 bits of the base address and the lower side 12 bits of the offset address.

In FIG. 1, DTLB 33 converts the VPN to PFN (Physical Frame Number) Upper side 20 bits of the physical address indicate PFN. and lower side 12 bits indicate the page offset. Additionally, the page offset of the physical address is the same as that of the virtual address.

Figure 5:
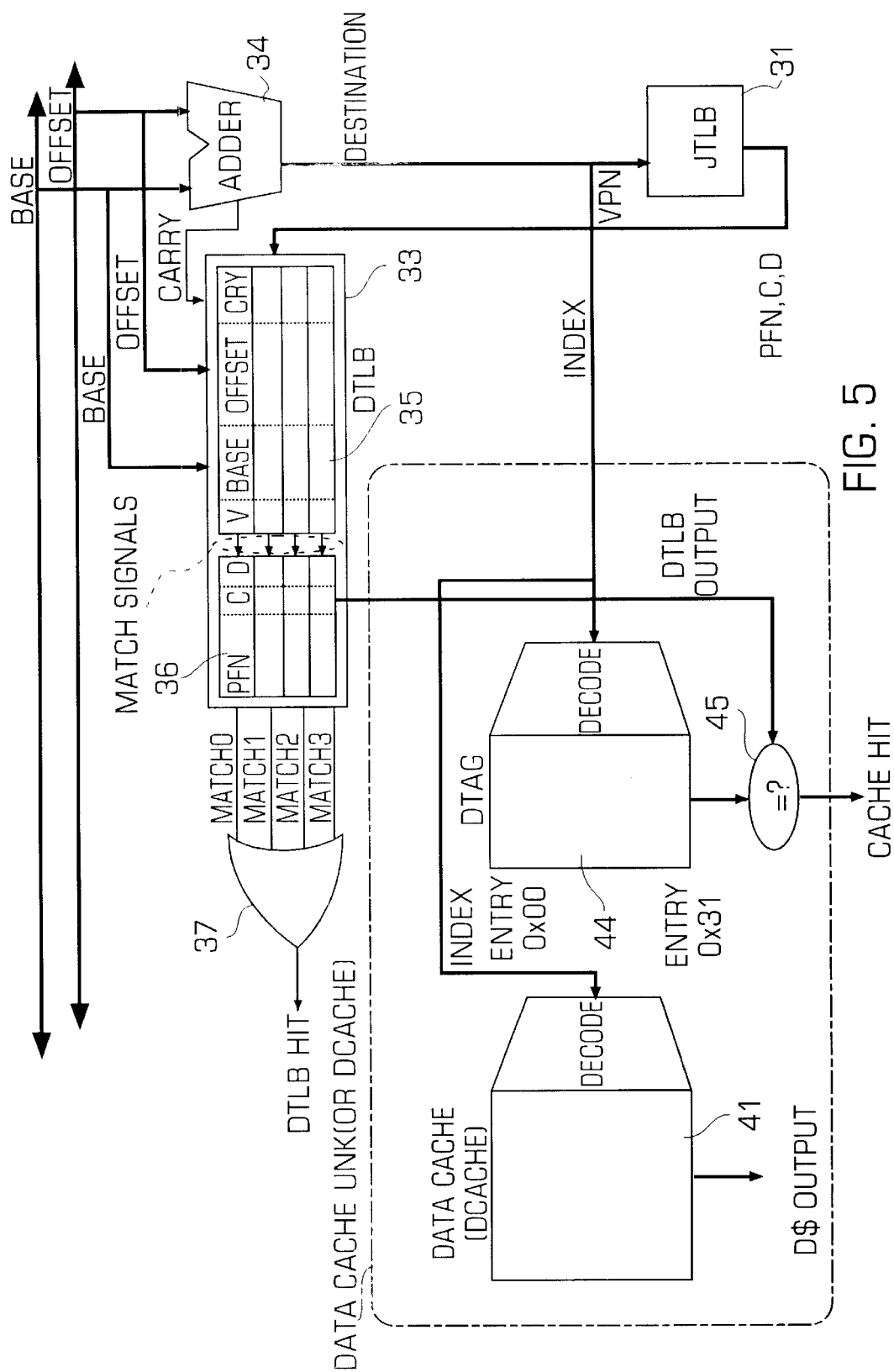
FIG. 5 is a block diagram showing a detailed configuration of the main section of MMU 3 and LSU 4.

FIG. 5 is a block diagram showing a detailed configuration of the main section of MMU 3 and LSU 4. An adder 34 shown in FIG. 5 adds the base address and the offset address in the virtual address which has received a request for access to the external memory. In this case, after the offset address is sign-extended to 32 bits, the address is added to the base address.

The adder 34 outputs the VPN (Virtual Page Number) indicating the addition result, and a carry signal indicating the presence/absence of digit overflow of the lower side bit string of the virtual address.

The DTLB 33 has a CAM (Contents Addressable Memory) 35 for detecting whether or not the virtual address which has received the access request matches the virtual address corresponding to the data stored in the DCACHE 41, and a physical address storage section 36 for storing the physical address of the data stored in the DCACHE 41, and the like.

The CAM 35 detects whether or not the address which has received the access request matches the address of the data stored in the DCACHE 41, based on the base and offset addresses which has received the access request and the carry signal outputted from the adder 34, and outputs a match/mismatch signal.

When the match signal is outputted from the CAM 35, the physical address storage section 36 outputs the physical address corresponding to the match signal Moreover, when the match signal is outputted from the CAM 35, a gate circuit 37 outputs a hit signal of the DTLB 33. The output of the gate circuit 37 is used for judging whether or not the processing of the processor is to be stalled.

The VPN outputted from the adder 34 is applied to the JTLB 31. The JTLB 31 refers to the conversion table, and outputs the PFN corresponding to the VPN, and the above-described C and D flags. Here, after the adder 34 performs addition, the VPN is applied to the JTLB 31 in order to minimize penalties in the case where there is no match entry in DTLB 33.

Moreover, the lower side bit string of VPN outputted from the adder 34 is applied as an index address to DTAG 44 and DCACHE 41. Each of the DTAG 44 and the DCACHE 41 decodes the index address to set an entry. Specifically, the bit string obtained by shifting the index address toward the lower side bit side by six bits is set as the entry when a cache line holds 16 word. The DTAG 44 outputs the physical address of the corresponding entry, and the DCACHE 41 outputs the data of the corresponding entry.

A comparator 45 compares the physical address outputted from the DTAG 44 with the physical address which is outputted from the physical address storage section 36 after the detection of the match by the CAM 35, and outputs a signal indicative of cache hit when both addresses are matched.

Figure 6:
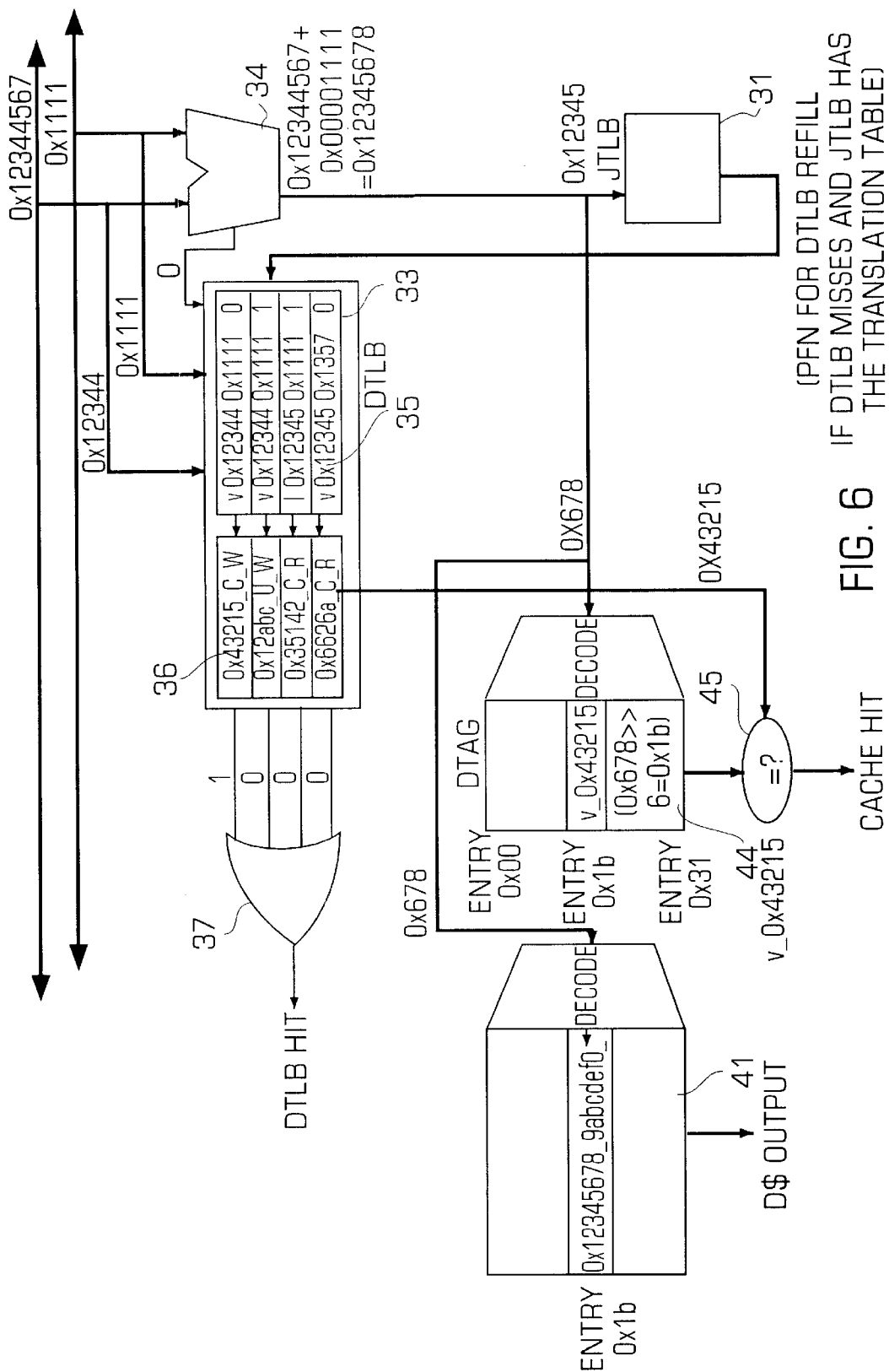
FIG. 6 is a diagram showing concrete operation of FIG. 5.

FIG. 6 is a diagram showing the concrete operation of FIG. 5. FIG. 6 shows the case where the base address which has received the request for access to the external memory is 0x12344567, and the offset address is 0x1111.

In this case, the output of the adder 34 is 0x12344567+ 0x00001111=0x12345678, the carry signal is 0, the upper side bit string of the base address applied to the DTLB 33 is 0x12344, and the upper side bit string of the offset address is 0x1111.

Moreover, FIG. 6 shows an example where there are four entries in the DTLB 33, and the data corresponding to the entries as shown in FIG. 6 are stored in the CAM 35 and the physical address storage section 36. In FIG. 6, "V" indicates that the DTAG 44 is valid, and "I" indicates that the DTAG 44 is invalid.

In the example of FIG. 6, a topmost entry is matched, and physical address 0x43215 is outputted along a bold arrow in FIG. 6. Additionally, C indicates that cache is allowable, and W indicates that data can be read/written. Moreover, U indicates that cache is inhibited, while R indicates that data can be read, but data writing is inhibited.

Moreover, index address 0x678, which is the lower side bit string of output 0x12345678 of the adder 34, is supplied to the DTAG 44 and the DCACHE 41. The DTAG 44 sets bit string 0x1b obtained by shifting 0x678 to the lower side by six bits as the entry, and outputs physical address information V_0x43215 stored in the DTAG 44.

The comparator 45 compares the physical address 0x43215 outputted from the DTAG 44 with the physical address 0x43215 outputted from the DTLB 33. In this case, since both addresses are matched, the comparator outputs a signal indicating cache hit.

Furthermore, the DCACHE 41 sets the bit string 0x1b obtained by shifting the index address 0x678 to the lower side by six bits as the entry, and outputs data 0x12345678_9abcef0 stored in the DTAG 44.

(First Configuration Example of DTLB 33)

Figure 7:
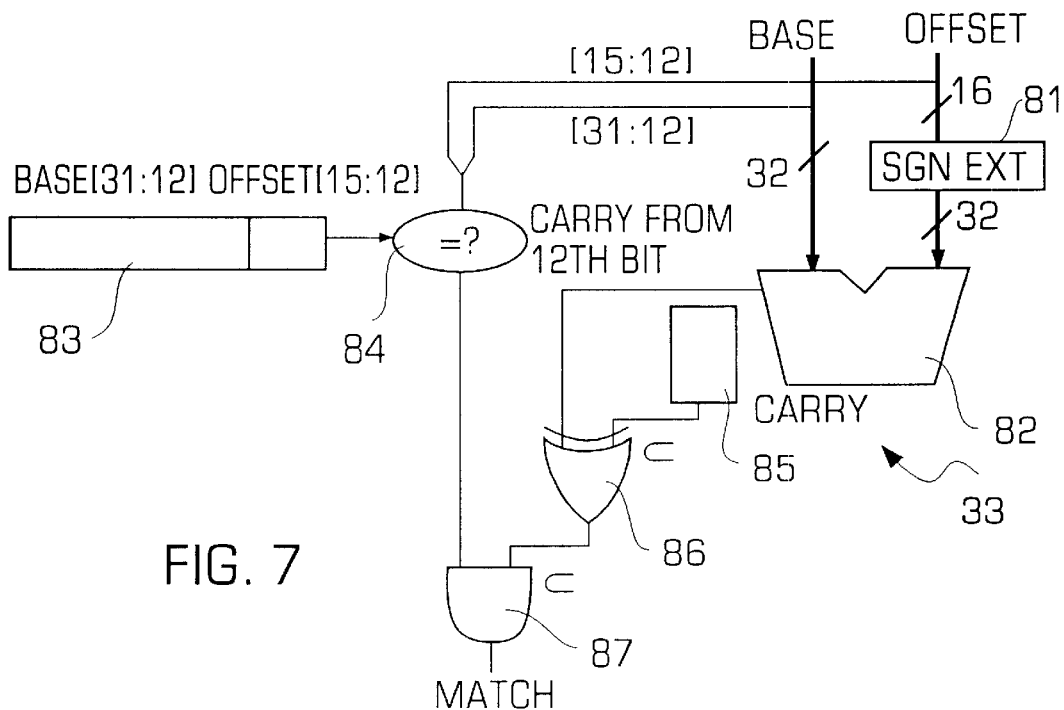
FIG. 7 is a block diagram showing a first configuration example of DTLB 33.

FIG. 7 is a block diagram showing a first configuration example of the DTLB 33. The DTLB 33 of FIG. 7 has a sign extender 81 for sign-extending the offset address from 16 bits to 32 bits; an adder 82 for adding the base address to the sign-extended offset address; a comparator (upper side address comparator) 84 for judging whether or not upper side 20 bits [31:12] of the base address match the base address stored in a upper side address storage section 83 in the CAM 35, and upper side 4 bits [15;12] of the offset address match the offset address stored in the upper side address storage section 83 in the CAM 35; a comparator (carry comparator) 86 for judging whether or not the carry signal outputted from the adder 82 matches the carry signal stored in a carry storage section 85 in the CAM 35; and a match detector 87 for outputting a match signal when the comparison results of the comparators 84 and 85 are matched. The comparator 84 is constituted of, for example, an EXOR gate, and the match detector 87 is constituted of, for example, an AND gate.

The operation of the DTLB 33 of FIG. 7 will next be described. The comparator 84 compares upper side 20 bits [31:12] of the base address of 32 bits with the base address stored in the upper side address storage section 83 in the CAM 35, additionally compares upper side 4 bits [15:12] of the offset address of 16 bits with the offset address stored in the upper side address storage section 83 in the CAM 35, and outputs a match signal when the addresses are matched.

On the other hand, the comparator 86 outputs a match signal when the carry signal outputted from the adder 82 matches the carry signal stored in the CAM 35. As described above, with respect to the lower side 12 bits of the virtual address, the judgment of match/mismatch is performed only with the carry signal. Therefore, the judgment of match/mismatch can be performed before the addition processing in the adder 82 is completed, and the speed of address conversion is improved.

(Second Configuration Example of DTLB 33)

In FIG. 7 since the adder 82 is used to generate the carry signal, there is a problem that much time is required until the carry signal is generated. To solve the problem, in a second configuration example, a carry lookahead circuit is disposed to generate the carry signal at a high speed.

Figure 8:
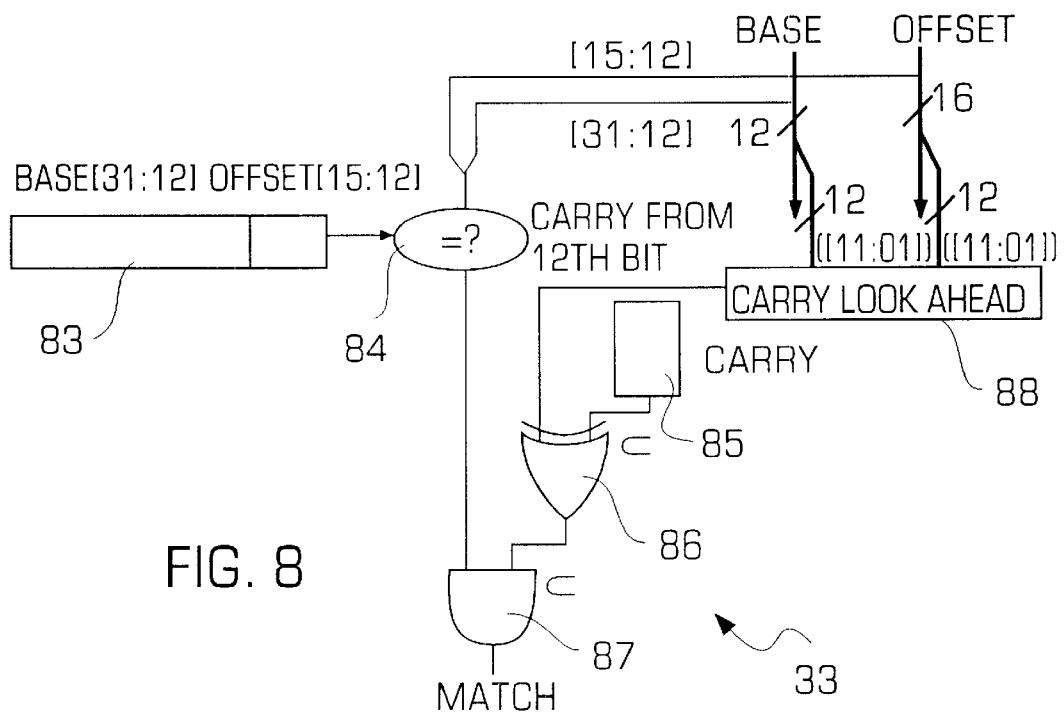
FIG. 8 is a block diagram showing a second configuration example of DTLB 33.

FIG. 8 is a block diagram showing the second configuration example of the DTLB 33. The DTLB 33 of FIG. 8 is constituted in the same manner as that of FIG. 7, except that the adder 82 is replaced with a carry lookahead circuit 88.

Figure 9:
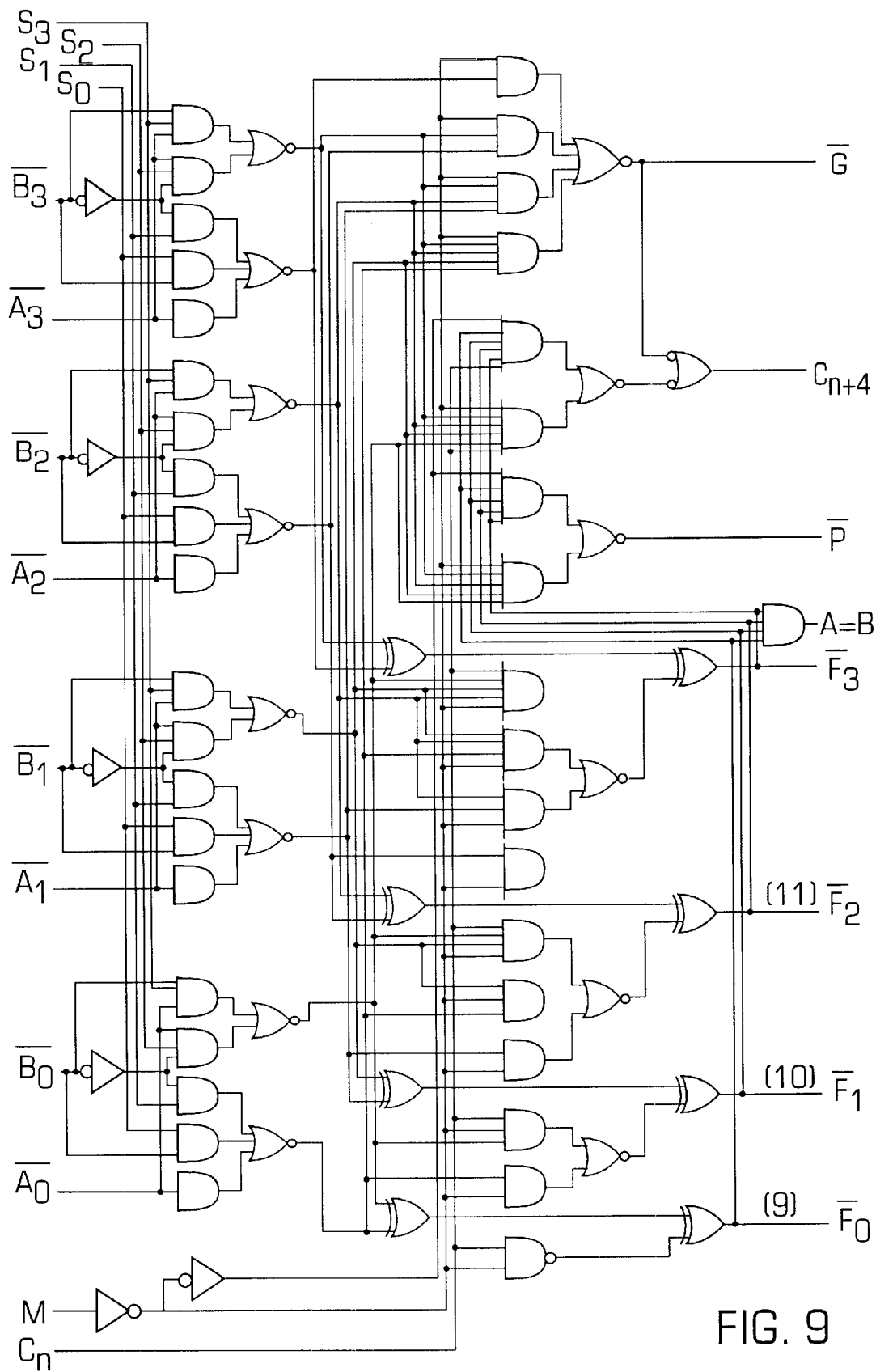
FIG. 9 is a circuit diagram showing an example of carry lookahead circuit 88.

FIG. 9 is a circuit diagram showing one example of the carry lookahead circuit 88. In the example, four bits A0 to A3, B0 to B3 are added to output the carry signals. The circuit of FIG. 9 can output the carry signal before the final addition result is calculated.

By providing the carry lookahead circuit 88 as shown in FIG. 9, it is possible to quickly judge whether or not the carry signals are matched, and as a result, it is possible to judge at a high speed whether or not DTLB hit is.

(Third Configuration Example of DTLB 33)

In the above-described first and second configuration examples, with respect to the lower side 12 bits of the virtual address, only the match/mismatch of the carry signals is detected. Therefore, there is a likelihood which is erroneously judged as a mismatch, even if the addition result of the base address and the offset address is originally matched.

For example, FIG. 10a shows an example where the base address stored in the CAM 35 is '0x80000000', and the offset address is '0x1234'. Since the addition result of both addresses is '0x80001234', the carry signal is 0 (no digit overflow).

On the other hand, FIG. 10b shows an example where the base address which has received the access request is '0x8000fff', and the offset address is '0x0125'. In this case, although the addition result of both addresses is '0x80001234', the offset address value and carry signal value of the latter example are different from those of the former example. Therefore, the comparison results of the comparators 84, 86 of FIG. 7 are not matched, and the match detector 87 finally outputs a signal indicative of DTLB miss hit.

FIG. 11 is a diagram showing an example that the first and second configuration examples cannot perform accurately DTLB hit detection As shown in (1) of FIG. 11, when upper side four bits of the offset address is A, and the carry signal from the lower side 12 bits is 0, the addition result is A. Moreover, as shown in (2) of FIG. 11, also when upper side four bits of the off set address is (A–1), and the carry signal from the lower side 12 bits is 1, the addition result is A, but cache miss hit is judged in the first and second configuration examples.

Similarly, as shown in (3) of FIG. 11, when upper side four bits of the offset address is (A+1), and the carry signal from the lower side 12 bits is 0, the addition result is (A+1). Moreover, as shown in (4) of FIG. 11, also when upper side four bits of the offset address is A, and the carry signal from the lower side 12 bits is 1, the addition result is (A+1), but also in this case, cache miss hit is judged in the first and second configuration examples.

Figure 12:
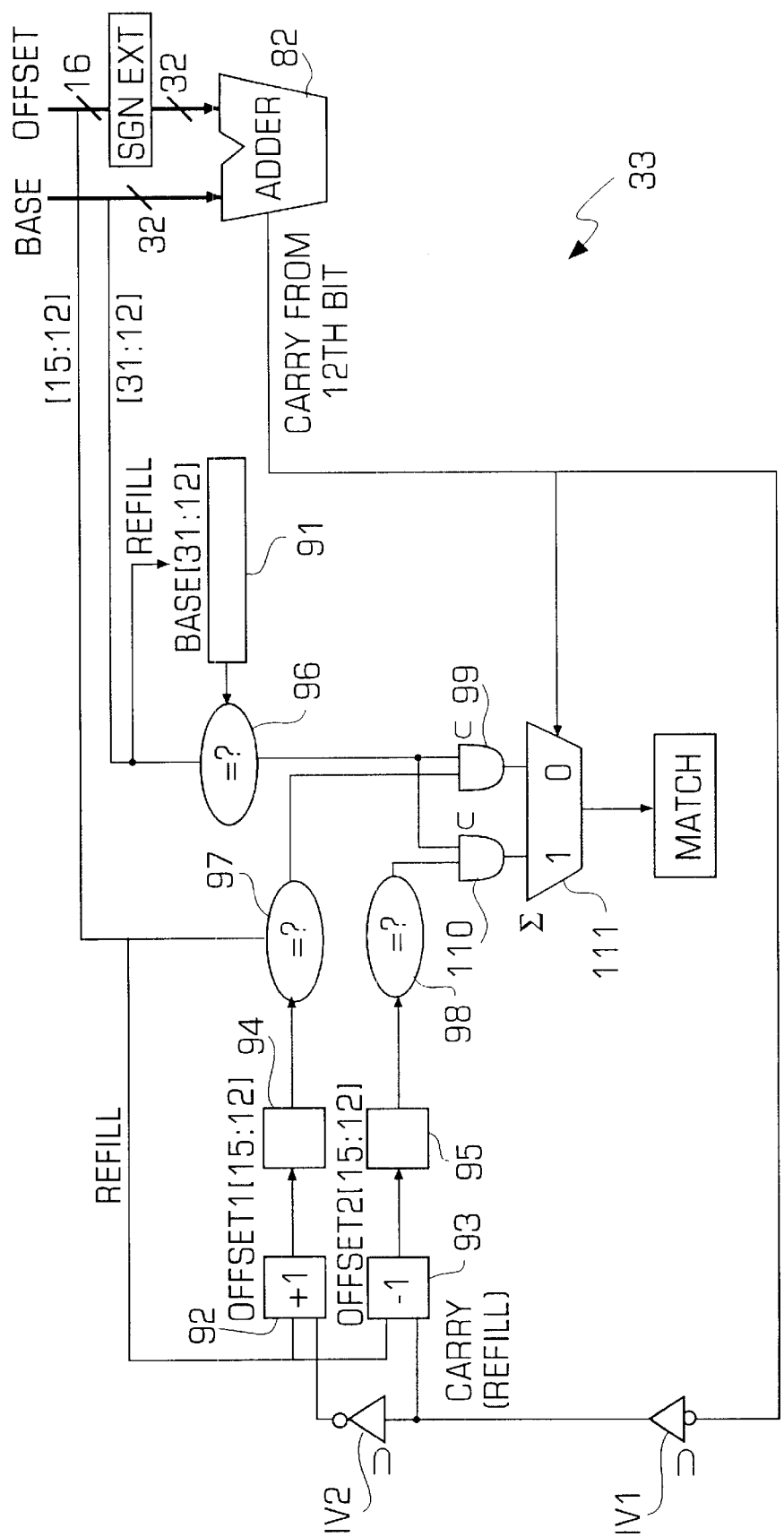
FIG. 12 is a block diagram showing a third configuration example of DTLB 33.

When the DTLB 33 makes a mistake, the conversion by the JTLB 31 is necessary, and consequently, penalty is generated FIG. 12 is a block diagram showing a third configuration example of the DTLB 33. In FIG. 12, the carry signal values differ, but the addition results of the base and offset addresses are the same, then the DTLB 33 judges DTLB hit.

In the same manner as in FIG. 7, the DTLB 33 of FIG. 12 has the sign extender 81 and the adder 82. Additionally, the DTLB 33 has a first storage section 91 for storing upper side 20 bits [31:12] of the base address; an inverter IV1 for inverting the logic of the carry signal from the adder 82; an inverter IV2 for inverting the output logic of the inverter IV1; an adder 92 for adding 1 to upper side 4 bits [15:12] of the offset address only when the output of the inverter IV2 is a upper side (carry signal is 1); a subtracter 93 which subtracts 1 from upper side 4 bits [15:12] of the offset address only when the output of the inverter IV1 is a upper side (carry signal is 0); a second storage section 94 for storing the output of the adder 92; a third storage section 95 for storing the output of the adder 93; a first comparator 96 for comparing 20 bit data stored in the first storage section 91 with the upper side 20 bit data of the base address which has received the request for access to the external memory; a second comparator 97 for comparing four bit data stored in the second storage section 94 with upper side 4 bits of the offset address which has received the access request; a third comparator 98 for comparing four bit data stored in the third storage section 95 with upper side 4 bits of the offset address; a gate circuit 99 for outputting a match signal when the comparison results of the comparators 96, 97 are matched; a gate circuit 110 for outputting a match signal when the comparison results of the comparators 96, 98 are matched; and a match detector 111 for selecting and outputting either one of outputs of the gate circuits 99, 110 in accordance with the logic of the carry signal. The first to third storage sections 91, 94, 95 are arranged in the CAM 35 shown in FIG. 5.

The operation of the circuit of FIG. 12 will next be described. When the upper side 4 bits of the offset address in the virtual address refilled in the DTLB 33 are A, and the carry signal is 0, the adder 92 outputs A as it is, and A is stored in the second storage section 94. Moreover, the subtracter 93 outputs (A−1), and (A−1) is stored in the third storage section 95.

Thereafter, when the upper side 4 bits of the offset address which has received the request for access to the external memory are A, and the carry signal is 0, the comparison result of the second comparator 97 is matched, and the comparison result of the third comparator 98 is mismatched. Therefore, the output of the gate circuit 99 becomes a high level, and the output of the gate circuit 110 becomes a low level. In this case, since the carry signal is 0, the match detector 111 selects the output of the gate circuit 99. In this case, since the output of the gate circuit 99 is a high level, the match detector 111 outputs a match signal.

When the upper side 4 bits of the offset address which has received the request for access to the external memory are (A−1), and the carry signal is 1, the comparison result of the third comparator 98 is matched, and the comparison result of the second comparator 97 is mismatched. Therefore, the output of the gate circuit 110 becomes a high level, and the output of the gate circuit 99 becomes a low level. In this case, since the carry signal is 1, the match detector 111 selects the output of the gate circuit 110. In this case, since the output of the gate circuit 110 becomes a high level, the match detector 111 outputs a match signal.

On the other hand, when the upper side 4 bits of the offset address in the virtual address refilled in the DTLB 33 are A, and the carry signal is 1, the adder 92 outputs (A+1), and (A+1) is stored in the second storage section 94. Moreover, the subtracter 93 outputs A as it is, and A is stored in the third storage section 95.

Thereafter, when the upper side 4 bits of the offset address which has received the request for access to the external memory are A, and the carry signal is 1, the comparison result of the third comparator 98 is matched, and the comparison result of the second comparator 97 is mismatched. Therefore, the output of the gate circuit 110 becomes a high level, and the output of the gate circuit 99 becomes a low level. In this case, since the carry signal is 1, the match detector 111 outputs a match signal which is the output of the gate circuit 110.

Moreover, when the base address which has received the request for access to the external memory is (A+1), and the carry signal is 0, the comparison result of the second comparator 97 is matched, and the comparison result of the third comparator 98 is mismatched. Therefore, the output of the gate circuit 99 becomes a high level, and the output of the gate circuit 110 becomes a low level. In this case, since the carry signal is 0, the match detector 111 outputs the match signal which is the output of the gate circuit 99.

As described above, in the circuit of FIG. 12, the value of the offset address stored in the CAM 35 is regulated by the value of the carry signal. Therefore, even if, as shown in FIG. 10, the original offset addresses are mismatched, but the addition results of the offset and base addresses are the same, then it is judged that the virtual addresses are matched. Therefore, this can improve the hit ratio without any timing penalty and with minimum hardware, and the processing speed of the processor is improved.

What is claimed is:

1. A translation lookaside buffer (TLB) circuit for converting a virtual address to a physical address comprising:

a carry storage section for storing digit overflow information when a lower side bit string of a base address and a lower side bit string of an offset address of virtual address information as a comparison criterion are added to each other;

an upper side address storage section for storing an upper side bit string of the base address and an upper side bit string of the offset address of the virtual address information as a comparison criterion;

a carry comparator for comparing a digit overflow information when a lower side bit string of the base address and a lower side bit string of the offset address of the virtual address information which has been received in an access request are added to each other, with the digit overflow information stored in said carry storage section;

an upper side address comparator for detecting whether or not the upper side bit string of the base address of the virtual address information which has been received in the access request matches the upper side bit string of the base address stored in said upper side address storage section, and for detecting whether or not the upper side bit string of the offset address of the virtual address information which has been received in the access request matches the upper side bit string of the offset address stored in said upper side address storage section; and a match detector for outputting a match signal of the virtual address only when comparison results by said carry comparator are matched and comparison results by the upper side address comparator are matched.

2. The circuit according to claim 1, comprising a CAM (Contents Addressable Memory) having said carry storage section, said upper side address storage section, said carry comparator, said upper side address comparator, and said match detector with respect to each of one or more types of virtual addresses, wherein said CAM stores the physical address corresponding to the virtual address and an accompanying attribute in a specific place, when no match of the virtual address which has been received in the access request is detected in any one of said match detectors corresponding to the virtual addresses stored in said address storage section.

3. The circuit according to claim 2, wherein said base address is constituted of 32 bits, said offset address is constituted of 16 bits, a MSB (Most Significant Bit) to the 16th bit of said base address corresponds to the upper side bit string, and the 15th bit to a LSB (Least Significant Bit) of said base address corresponds to the lower side bit string, and the MSB to the 12th bit of said offset address corresponds to the upper side bit string, and the 11th bit to the LSB of said offset address corresponds to the lower side bit string.

4. The circuit according to claim 3, wherein said offset address has a sign bit indicative of a positive or negative sign, and said CAM performs conversion to the physical address on the basis of 25 bits constituted by upper side bit string and the upper 4 bits of the lower side bit string of said base address, said sign bit, upper side 3 bits of said offset address, and a carry bit obtained when lower side 12 bits of said base address and lower side 12 bits of said offset address are added to each other.

5. A microprocessor comprising the circuit according to claim 3, wherein when the lower side 12 bits of said base address and the lower side 12 bits of said offset address are added to each other, after said offset address is sign-extended to 32 bits and in the state of 32 bits, both of the lower side 12 bits are added to each other.

6. A translation lookaside buffer (TLB) circuit for converting a virtual address to a physical address comprising:

a first storage section for storing an upper side bit string of a base address of virtual address information as a comparative criterion;

a second storage section for storing a bit string obtained by adding 1 to an upper side bit string of an offset address of the virtual address information in the case where there is a digit overflow when a lower side bit string of the base address and a lower side bit string of the offset address of the virtual address information as the comparison criterion are added to each other, and for storing the upper side bit string of the offset address of the virtual address information in the case where there is no digit overflow;

a third storage section for storing the upper side bit string of the offset address of the virtual address information in the case where there is the digit overflow when the lower side bit string of the base address and the lower side bit string of the offset address of the virtual address information as the comparison criterion are added to each other, and for storing the bit string obtained by subtracting 1 from the upper side bit string of the offset address of the virtual address information in the case where there is no digit overflow;

a first comparator for comparing the upper side bit string of the base address of the virtual address information which has been received in an access request, with the bit string stored in said first storage section;

a second comparator for comparing the lower side bit string of the base address of the virtual address information which has been received in the access request, with the bit string stored in said second storage section;

a third comparator for comparing whether or not the lower side bit string of the base address of the virtual address information which has been received in the access request matches the bit string stored in said third storage section; and a match detector for outputting a signal indicating whether or not the virtual address which has been received in the access request matches the virtual address as the comparison criterion on the basis of comparison results of said first to third comparators.

7. The circuit according to claim 6, wherein in the case where there is no digit overflow when the lower side bit string of the base address and the lower side bit string of the offset address of the virtual address information which has been received in the access request are added to each other, said match detector outputs a match signal of the virtual address only when matches are detected both in said first and second comparators, and in the case where there is the digit overflow when the lower side bit string of the base address and the lower side bit string of the offset address of the virtual address information which has been received in the access request are added to each other, said match detector outputs the match signal of the virtual address only when matches are detected both in said first and third comparators.

8. The circuit according to claim 6 comprising a CAM having said first to third storage sections and said first to third comparators, corresponding to each of one or more types of virtual addresses, wherein said CAM stores the physical address corresponding to the virtual address and an accompanying attribute in a specific place, when no match of the virtual address which has been received in the access request is detected in any one of said match detectors.

9. The circuit according to claim 8, wherein said base address is constituted of 32 bits, said offset address is constituted of 16 bits, the MSB to the 16th bit of said base address corresponds to the upper side bit string, and the 15th bit to the LSB of said base address corresponds to the lower side bit string, and the MSB to the 12th bit of said offset address corresponds to the upper side bit string, and the 11th bit to the lowest bit of said offset address corresponds to the lower side bit string.

10. The circuit according to claim 9, wherein said offset address has a sign bit indicative of a positive or negative sign, and said CAM performs conversion to the physical address on the basis of 25 bits constituted by upper side bit string and the upper 4 bits of the lower side bit string of said base address, said sign bit, upper side 3 bits of said offset address, and a carry bit obtained when lower side 12 bits of said base address and lower side 12 bits of said offset address are added to each other.

11. A microprocessor comprising the circuit according to claim 9, wherein when the lower side 12 bits of said base address and the lower side 12 bits of said offset address are added to each other, after said offset address is sign-extended to 32 bits, the addition is performed.

* * * * *

UNITED STATES PATENT AND TRADEMARK OFFICE
CERTIFICATE OF CORRECTION

PATENT NO. : 6,374,342 B1 Page 1 of 1
DATED : April 16, 2002
INVENTOR(S) : Kobayashi et al.

It is certified that error appears in the above-identified patent and that said Letters Patent is hereby corrected as shown below:

<u>Title page,</u>
Item [73], the name of the Assignee should be changed from "NTT Communicationware Corporation" to -- NTT Comware Corporation --.

Signed and Sealed this

Eleventh Day of March, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,374,342 B1
DATED : April 6, 2002
INVENTOR(S) : Masashi Sasahara

It is certified that error appears in the above-identified patent and that said Letters Patent is hereby corrected as shown below:

This certificate supersedes Certificate of Correction issued March 11, 2003, the number was erroneously mentioned and should be vacated since no Certificate of Correction was granted.

Signed and Sealed this

Fifteenth Day of April, 2003

JAMES E. ROGAN
*Director of the United States Patent and Trademark Office*